United States Patent
Uchida et al.

(10) Patent No.: US 9,333,868 B2
(45) Date of Patent: May 10, 2016

(54) CHARGING CONNECTOR ACCOMMODATION APPARATUS FOR USE IN TRUCK-TYPE ELECTRIC VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Takanobu Uchida, Anjo (JP); Takashi Yakata, Toyoake (JP); Isahiro Imamura, Okazaki (JP); Masanori Kobayashi, Okazaki (JP); Tatsuaki Kawahara, Gamagori (JP); Kenshiro Miyashita, Komae (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 246 days.

(21) Appl. No.: 14/039,851

(22) Filed: Sep. 27, 2013

(65) Prior Publication Data
US 2014/0091761 A1 Apr. 3, 2014

(30) Foreign Application Priority Data
Sep. 28, 2012 (JP) .................................. 2012-216916

(51) Int. Cl.
*B60L 11/18* (2006.01)
*B60R 16/023* (2006.01)

(52) U.S. Cl.
CPC ......... *B60L 11/1816* (2013.01); *B60R 16/0239* (2013.01)

(58) Field of Classification Search
CPC ... B60L 11/1816; B60L 11/18; B60L 11/182; B60L 11/1838; B60L 11/1818; B60L 11/1846; B60L 11/1862
USPC ..................... 320/109; 701/22; 439/660, 662; 363/146
See application file for complete search history.

(56) References Cited

U.S. PATENT DOCUMENTS 2,723,380 A 11/1955 Howard
3,270,267 A 8/1966 Nolte, Jr.
(Continued)

FOREIGN PATENT DOCUMENTS

CN 201321063 Y 10/2009
DE 10 2012 101 397 A1 8/2012
(Continued)

OTHER PUBLICATIONS

Extended European Search Report issued Sep. 19, 2014 in corresponding European Application No. EP 13 18 6237.

*Primary Examiner* — Richard Isla Rodas
*Assistant Examiner* — Dung V Bui
(74) *Attorney, Agent, or Firm* — Birch, Stewart, Kolasch & Birch, LLP (57) ABSTRACT

A charging connector accommodation apparatus for use in a truck-type or pickup-type electric vehicle includes a box body having an opening facing an outside of a vehicle body and an opening facing an inside of the vehicle body, and a lid member. The box body includes a frame body, and a center panel disposed inside the frame body. A bent edge folded toward the outside and joined to the frame body is provided at the center panel. A highly rigid frame section enhanced in rigidity by the bent edge is disposed is provided more outward to the outside than the center panel, and a hollow frame section having rigidity lower than that of the highly rigid frame section is disposed is provided more inward to the inside than the center panel of the box body.

6 Claims, 8 Drawing Sheets

(56) References Cited

U.S. PATENT DOCUMENTS

| | | | |
|---|---|---|---|
| 5,344,330 A | 9/1994 | Hoffman | |
| 5,437,939 A | 8/1995 | Beckley | |
| 5,545,046 A * | 8/1996 | Masuda et al. | 439/142 |
| 5,997,344 A * | 12/1999 | Shinozaki | 439/489 |
| 6,224,136 B1 * | 5/2001 | Takagi | 296/96.21 |
| 2010/0026238 A1 * | 2/2010 | Suzuki et al. | 320/109 |
| 2011/0266996 A1 * | 11/2011 | Sugano | 320/104 |
| 2012/0019206 A1 * | 1/2012 | Sekido et al. | 320/109 |
| 2012/0038319 A1 | 2/2012 | Sekido et al. | |
| 2012/0049799 A1 * | 3/2012 | Terashima et al. | 320/109 |
| 2012/0212967 A1 | 8/2012 | Sawayanagi | |
| 2012/0228874 A1 | 9/2012 | Jingu et al. | |
| 2012/0256589 A1 * | 10/2012 | Ichikawa | 320/111 |
| 2012/0286541 A1 * | 11/2012 | Kashiwagi | 296/193.07 |
| 2012/0303397 A1 * | 11/2012 | Prosser | 705/7.12 |
| 2013/0309898 A1 | 11/2013 | Mizuno et al. | |
| 2014/0091761 A1 * | 4/2014 | Uchida et al. | 320/109 |

FOREIGN PATENT DOCUMENTS

| | | |
|---|---|---|
| EP | 0 662 725 A1 | 7/1995 |
| EP | 2 500 204 A1 | 9/2012 |
| GB | 2 458 754 A | 10/2009 |
| JP | 2002-316540 A | 10/2002 |
| JP | 2005-80490 A | 3/2005 |
| JP | 2009-247176 A | 10/2009 |
| JP | 2010-166756 A | 7/2010 |
| JP | 2011-51798 A | 3/2011 |
| JP | 2011-182601 A | 9/2011 |
| WO | WO 94/16475 A1 | 7/1994 |
| WO | WO 2010/119327 A1 | 10/2010 |
| WO | WO 2013/073049 A1 | 5/2013 |

\* cited by examiner

CHARGING CONNECTOR ACCOMMODATION APPARATUS FOR USE IN TRUCK-TYPE ELECTRIC VEHICLE

CROSS-REFERENCE TO RELATED APPLICATION(S)

This application is based upon and claims the benefit of priority from prior Japanese patent application No. 2012-216916, filed on Sep. 28, 2012, the entire contents of which are incorporated herein by reference.

BACKGROUND

The present invention relates to a charging connector accommodation apparatus to be applied to a truck-type (or pickup-type) electric vehicle equipped with a drive motor and a drive battery.

A truck-type (or pickup-type) electric vehicle having a loading platform is equipped with a frame serving as the framework of the vehicle body thereof, a cabin formed above and on the front side of the frame, a loading platform mounted on the frame behind the cabin, a drive motor, a drive battery, a charging apparatus that is used when the drive battery is charged, a charging connector electrically connected to the charging apparatus, and the like. When the drive battery is charged, the charging gun of a power cable or the like is connected to the charging connector.

In the case of a charging connector for use in a vehicle in which the rate of the cabin occupied in the entire vehicle body is high as in the case of a passenger car, for example, a charging connector accommodation section and a lid for closing/closing the charging connector accommodation section can be provided inside an outer panel or the like constituting the outer wall of the cabin as described in JP-A-2009-247176 or JP-A-2010-166756, for example.

However, in the case of a truck-type electric vehicle having a loading platform, different from a passenger car type vehicle having no loading platform, the rate of the cabin occupied in the entire vehicle body is low, whereby it is sometimes difficult to securely obtain a space for the installation of a charging connector in the cabin. Although it is conceivable that the charging connector is disposed on a portion of the vehicle body (for example, a side member), such a portion in which the charging connector can be disposed, other than in the cabin, (for example, the vehicle-body outer side face of the side member) is usually exposed to a side of the vehicle. Hence, it is necessary not only to protect the charging connector against collision with obstacles from the outside of the vehicle body but also to take a countermeasure to protect the charging connector against rainwater and against water, mud, and the like spattering during vehicle washing.

SUMMARY

It is therefore an object of the invention to provide a charging connector accommodation apparatus capable of solving the problems encountered in the case that a charging connector is provided at a position other than in the cabin.

In order to achieve the object, according to the invention, there is provided a charging connector accommodation apparatus for use in a truck-type or pickup-type electric vehicle having a drive motor and a drive battery configured to supply electric power to the drive motor, the charging connector accommodation apparatus comprising: a box body having a first opening facing an outside of a vehicle body and a second opening facing an inside of the vehicle body; and a lid member, capable of being opened and closed, configured to cover the first opening, wherein the box body includes: a frame body made of a plurality of panels and formed into a frame shape; and a center panel disposed inside the frame body, a bent edge folded toward the outside of the vehicle body and joined to an inner peripheral face of the frame body is provided at an peripheral end of the center panel, a highly rigid frame section which is enhanced in rigidity by virtue of the bent edge and in which a connection port portion of a charging connector is disposed is provided more outward to the outside of the vehicle body than the center panel of the box body, and a hollow frame section which has rigidity lower than that of the highly rigid frame section against a load input from the outside of the vehicle body and in which a cable side portion of the charging connector is disposed is provided more inward to the inside of the vehicle body than the center panel of the box body.

The plurality of panels of the frame body may be a front panel positioned on a front side of the vehicle body, a rear panel positioned on a rear side of the vehicle body, an upper panel positioned on an upper side, and a lower panel positioned on a lower side. The front panel may include: a front panel body section; an extension section which extends from the front panel body section to the inside of the vehicle body and a height of which is lower than that of the front panel body section; and a mounting section which extends from the extension section to the front side of the vehicle body and which is secured to a vehicle-body outer side face of a side member. The rear panel may include: a rear panel body section; an extension section which extends from the rear panel body section to the inside of the vehicle body and a height of which is lower than that of the rear panel body section; and a mounting section which extends from the extension section to the rear side of the vehicle body and which is secured to the vehicle-body outer side face of the side member.

An upward bent edge may be formed at a vehicle-body outer side end of the upper panel, and a flange section configured to cover the upward bent edge from the outside of the vehicle body may be provided on the lid member.

The center panel may include a lower portion and an upper portion, an upper side of the lower portion may have a shape tilted to the inside of the vehicle body, and the charging connector may be mounted on the lower portion.

The box body may be mounted on a vehicle-body outer side face of a side member in a space formed between a rear face of a cabin of the vehicle below a loading platform and a rear tire.

The rear panel may be formed with a bead section, and a height of the bead section may be the same as a height of the charging connector.

DETAILED DESCRIPTION OF EXEMPLARY EMBODIMENTS

An embodiment according to the present invention will be described below referring to FIGS. 1 to 8.

Figure 1:
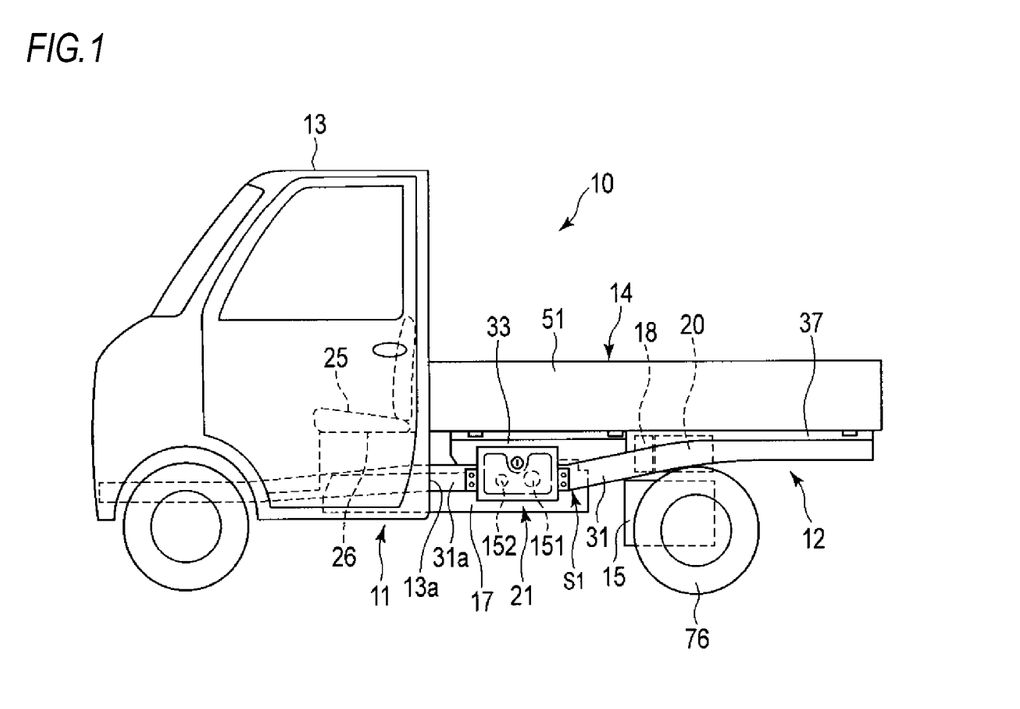
FIG. 1 is a side view showing a truck-type (or pickup-type) electric vehicle according to an embodiment.
Figure 2:
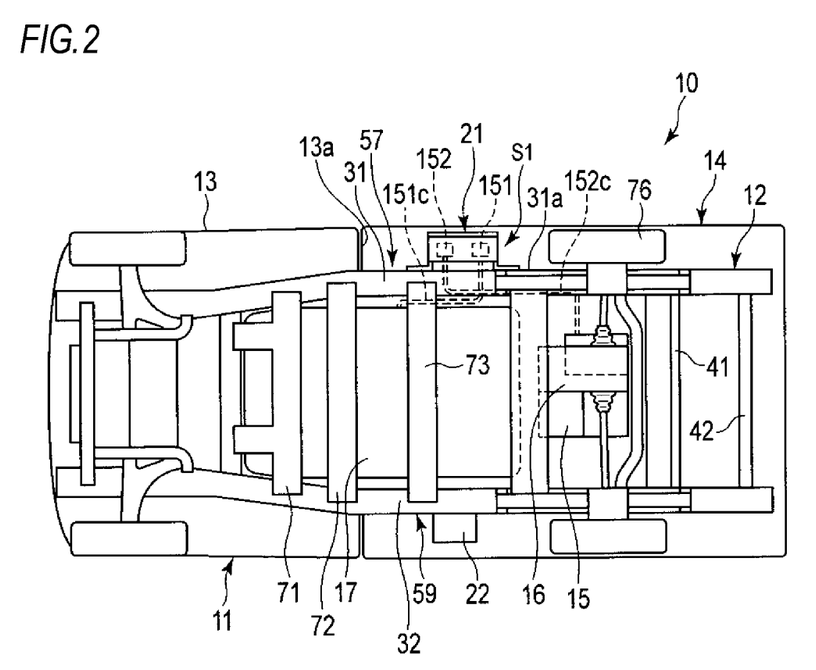
FIG. 2 is a bottom view showing the truck-type electric vehicle shown in FIG. 1.

FIG. 1 is a side view showing an example of a truck-type (or pickup-type) electric vehicle 10, and FIG. 2 is a bottom view showing the truck-type electric vehicle 10. The truck-type electric vehicle 10 is equipped with a frame (vehicle body frame) 12 serving as the framework of a vehicle body 11, a cabin 13 formed above and on the front side of the frame 12, a loading platform 14 provided behind the cabin 13, a drive motor 15, a transmission 16, a drive battery 17 serving as the power source for the drive motor 15, a motor control unit (MCU) 18 for controlling the drive motor 15, a charger 20, a charging connector accommodation apparatus 21, a 12-volt battery 22 serving as the power source for vehicle-mounted electrical parts, and the like. The charging connector accommodation apparatus 21 will be described later in detail.

A seat 25 on which an occupant sits is disposed inside the cabin 13. The drive battery 17 is disposed so as to extend from the lower side of a floor panel 26 positioned under the seat 25 inside the cabin 13 to the lower side and the front half section of the loading platform 14.

Figure 3:
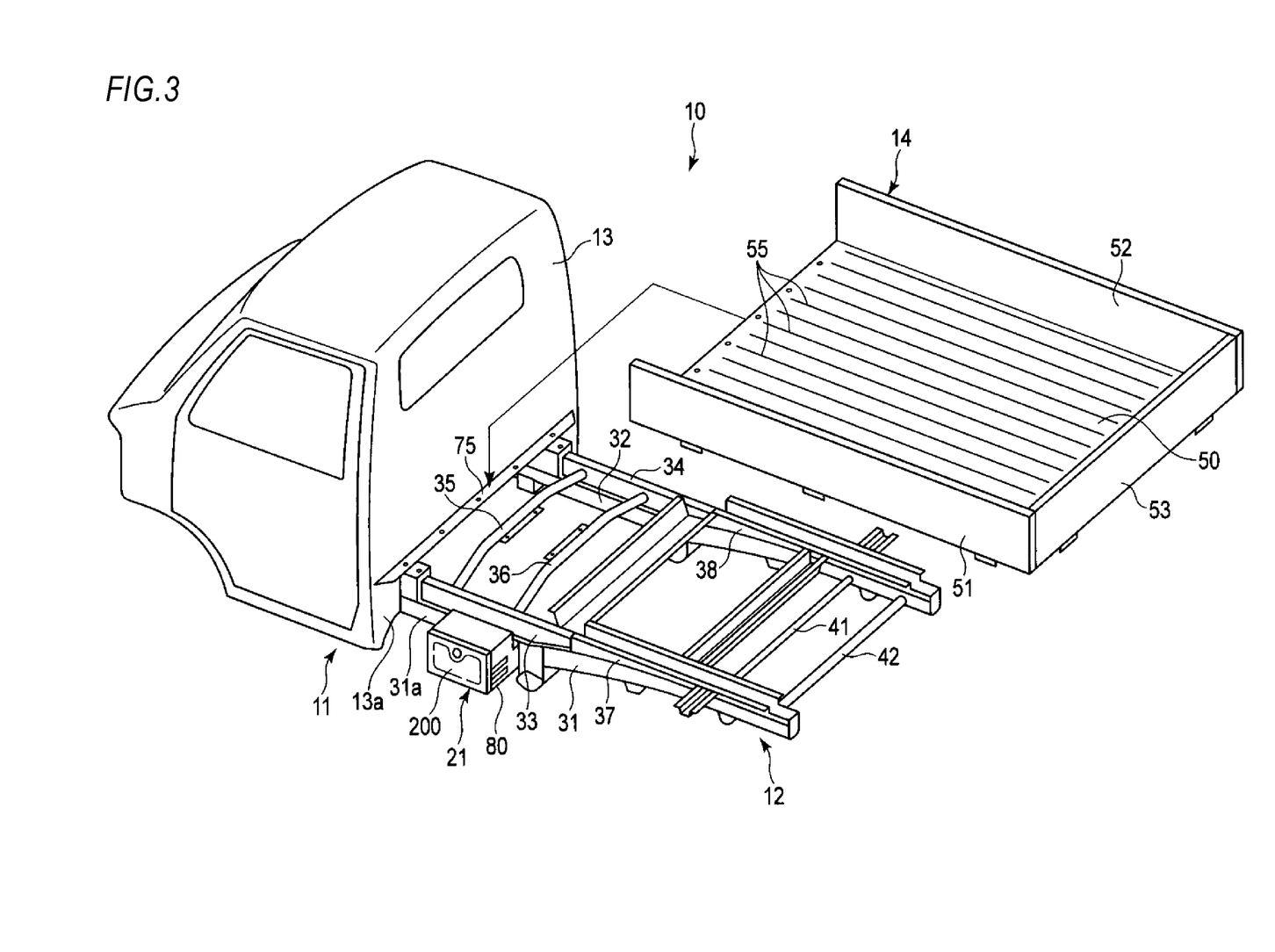
FIG. 3 is a perspective view showing a part of the truck-type electric vehicle shown in FIG. 1, the loading platform thereof being removed.
Figure 4:
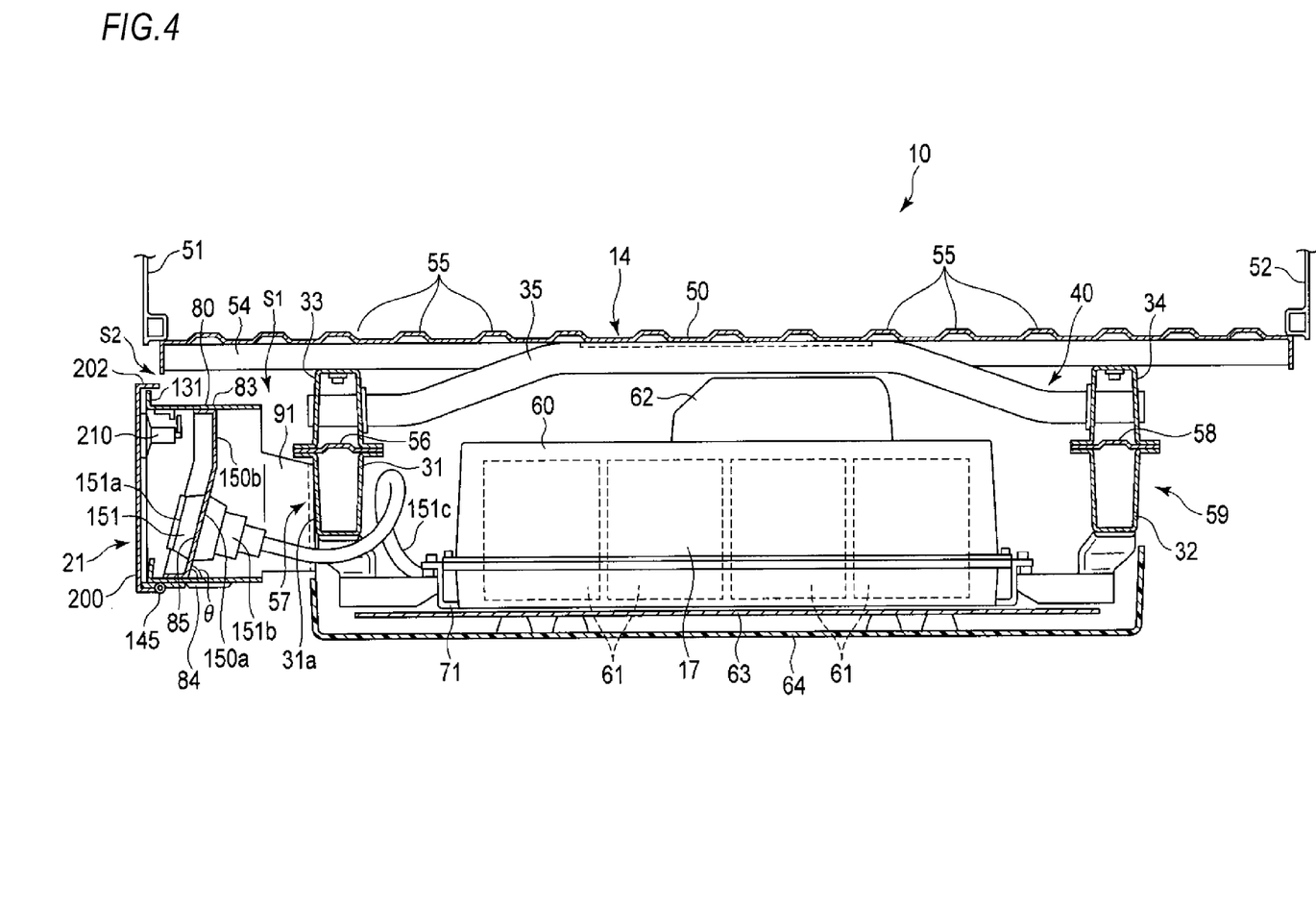
FIG. 4 is a cross-sectional view showing a part of the truck-type electric vehicle shown in FIG. 1, taken in the widthwise direction of the vehicle body thereof.
Figure 5:
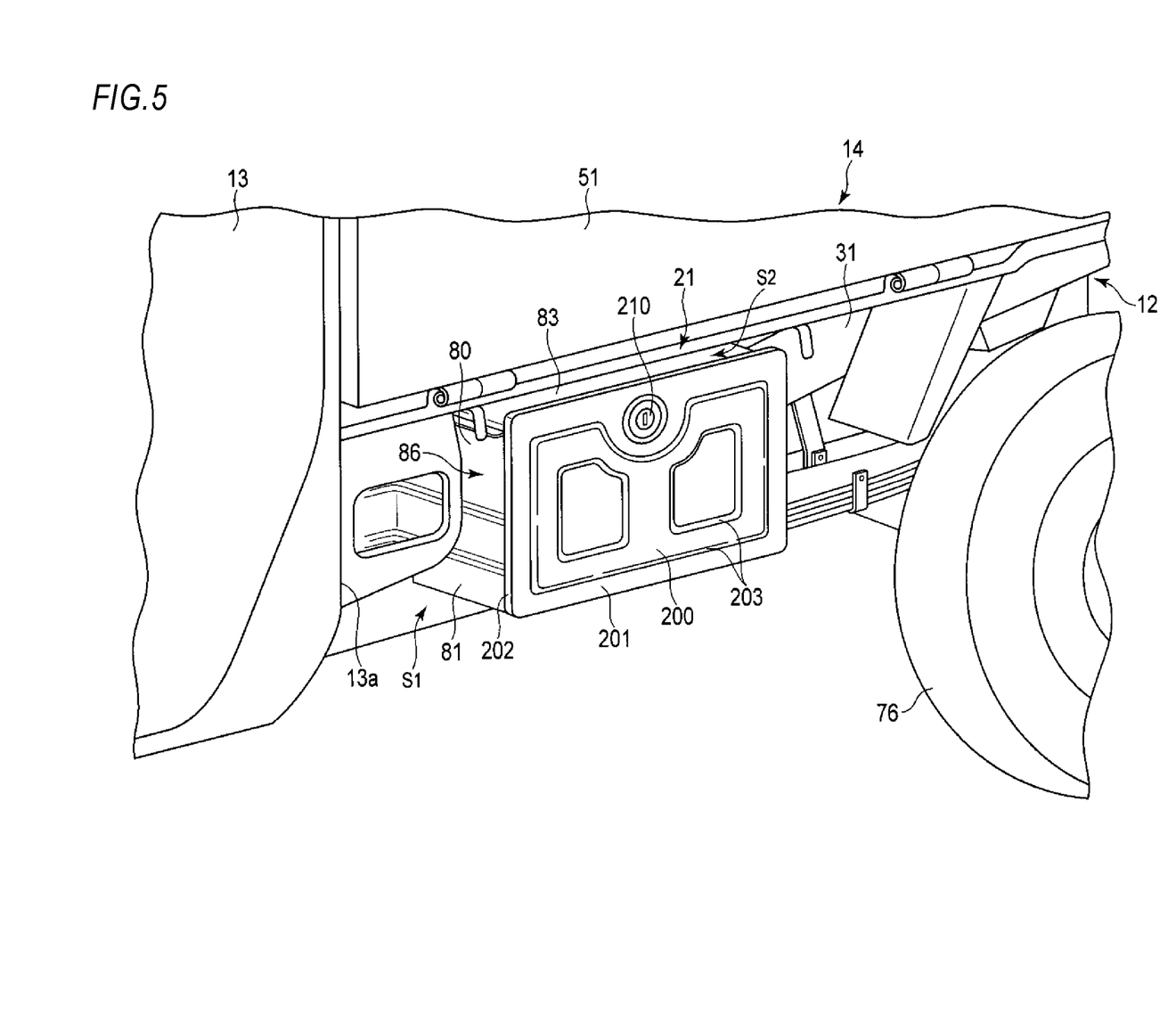
FIG. 5 is a perspective view in the vicinity of the charging connector accommodation apparatus of the truck-type electric vehicle shown in FIG. 1.

FIG. 3 is a perspective view showing apart of the vehicle body 11 and the loading platform, FIG. 4 is a cross-sectional view taken in the widthwise direction of the vehicle 10, and FIG. 5 is a magnified perspective view in the vicinity of the charging connector accommodation apparatus 21. The frame 12 constituting a part of the vehicle body 11 includes a pair of left and right side members 31 and 32 extending in the front-rear direction of the vehicle body 11, sub-frames 33 and 34 provided on the side members 31 and 32, cross members 35 and 36 provided between the sub-frames 33 and 34, side-member extension members 37 and 38 disposed on the side members 31 and 32 behind the sub frames 33 and 34, cross members 41 and 42 provided between the rear sections of the sub-frames 33 and 34, and the like. In this specification, one of the pair of side members 31 and 32 is sometimes referred to as a first side member 31 and the other is sometimes referred to as a second side member 32, for convenience of description.

As shown in FIG. 3, the loading platform 14 includes a floor member 50 on which loads are placed, gate plates 51, 52 and 53 provided on both side sections and the rear section of the floor member 50, cross sill members 54 (shown in FIG. 4) provided on the lower face of the floor member 50, and the like. The cross sill members 54 extend in the widthwise direction of the vehicle body 11. On the floor member 50 of the loading platform 14, a plurality of bead-like reinforcing sections 55 for enhancing rigidity are formed along the front-rear direction of the vehicle body 11, for example.

As shown on the left side of FIG. 4, a side member cover 56 is provided between the first side member 31 and the sub-frame 33. A first side-frame structural body 57 having a highly rigid two-storied structure is formed using the first side member 31, the sub-frame 33, and the side member cover 56. A side member cover 58 is also provided between the second side member 32 and the sub-frame 34 shown on the right side of FIG. 4. A second side-frame structural body 59 having a highly rigid two-storied structure is formed using the second side member 32, the sub-frame 34, and the side member cover 58.

The drive battery 17 is disposed between the side-frame structural bodies 57 and 59. The drive battery 17 includes a battery case 60 and battery modules 61 disposed inside the battery case 60. An example of the battery module 61 is formed of a plurality of lithium-ion battery cells connected in series. A duct section 62 through which cooling air flows is formed on the upper face side of the battery case 60. An electromagnetic shield member 63 is disposed on the lower face side of the drive battery 17. An under cover 64 is provided under the electromagnetic shield member 63. Although the electromagnetic shield member 63 shown in FIG. 4 is formed so as to be separated from the under cover 64, an electromagnetic shield member made of a metal mesh or the like may be provided inside the under cover 64 or on the upper face of the under cover 64 so as to be integrated with the under cover 64.

A plurality of beam members 71, 72 and 73 (shown in FIG. 2) are provided on the lower face side of the battery case 60. The beam members 71, 72 and 73 are made of a metallic material (for example, steel) having strength sufficient to support the weight of the drive battery 17. The drive battery 17 is supported to the side of the frame 12 formed of the side members 31 and 32 and the like, by the beam members 71, 72 and 73.

As shown in FIGS. 3 and 4, the loading platform 14 is placed on the sub-frames 33 and 34, the cross members 35 and 36, the side-member extension members 37 and 38 and a support section 75 on the rear face of the cabin 13, and secured thereto by securing means, such as bolts or welding.

The charging connector accommodation apparatus 21 will be described below.

As shown in FIGS. 1 to 5, the charging connector accommodation apparatus 21 according to this embodiment is installed on the vehicle-body outer side face 31a of the side member 31. In other words, the charging connector accommodation apparatus 21 is disposed below the loading platform 14 and in a space S1 formed between a portion 13a of the rear face of the cabin 13 and a rear tire 76.

Figure 6:
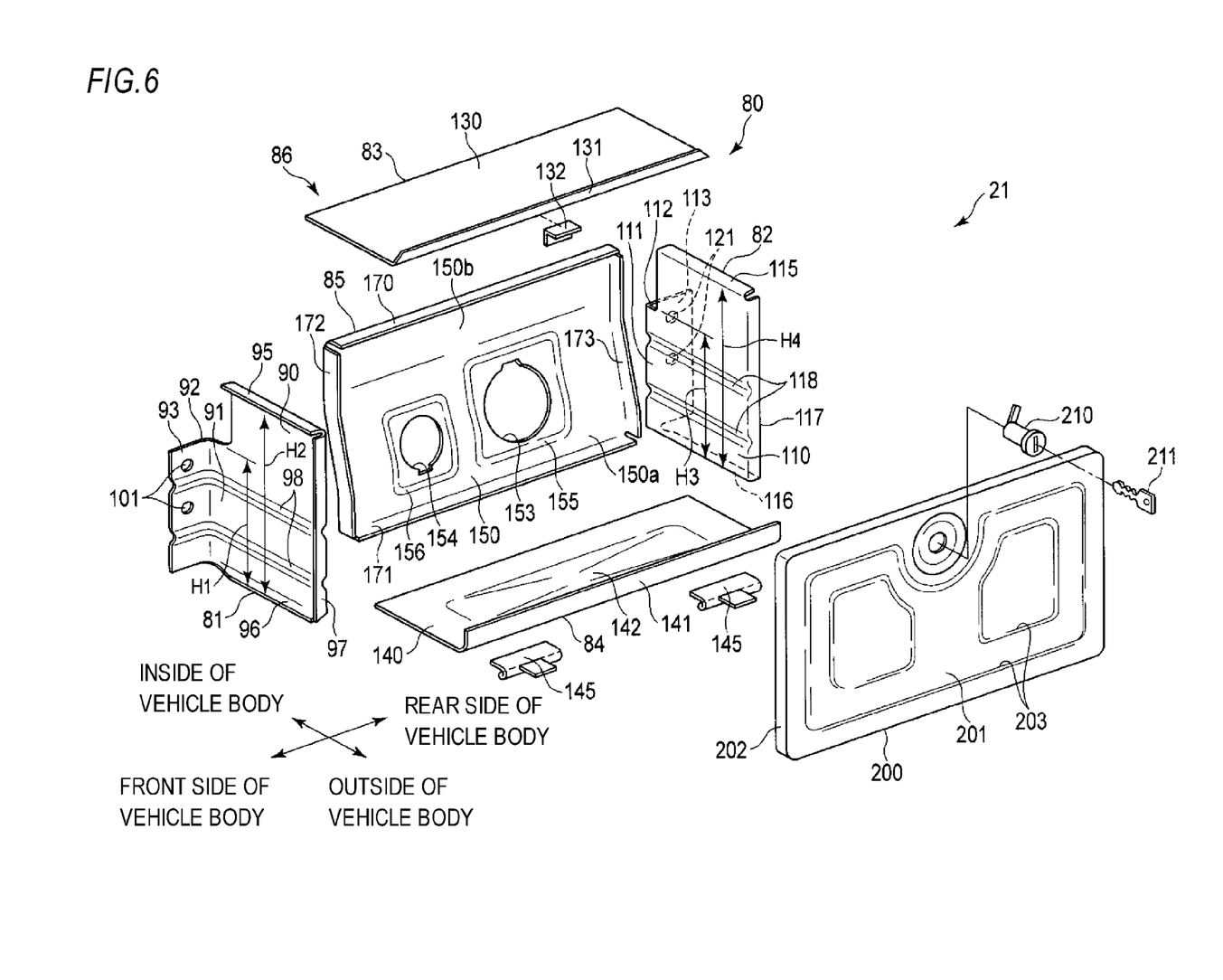
FIG. 6 is an exploded perspective view showing the charging connector accommodation apparatus.
Figure 7:
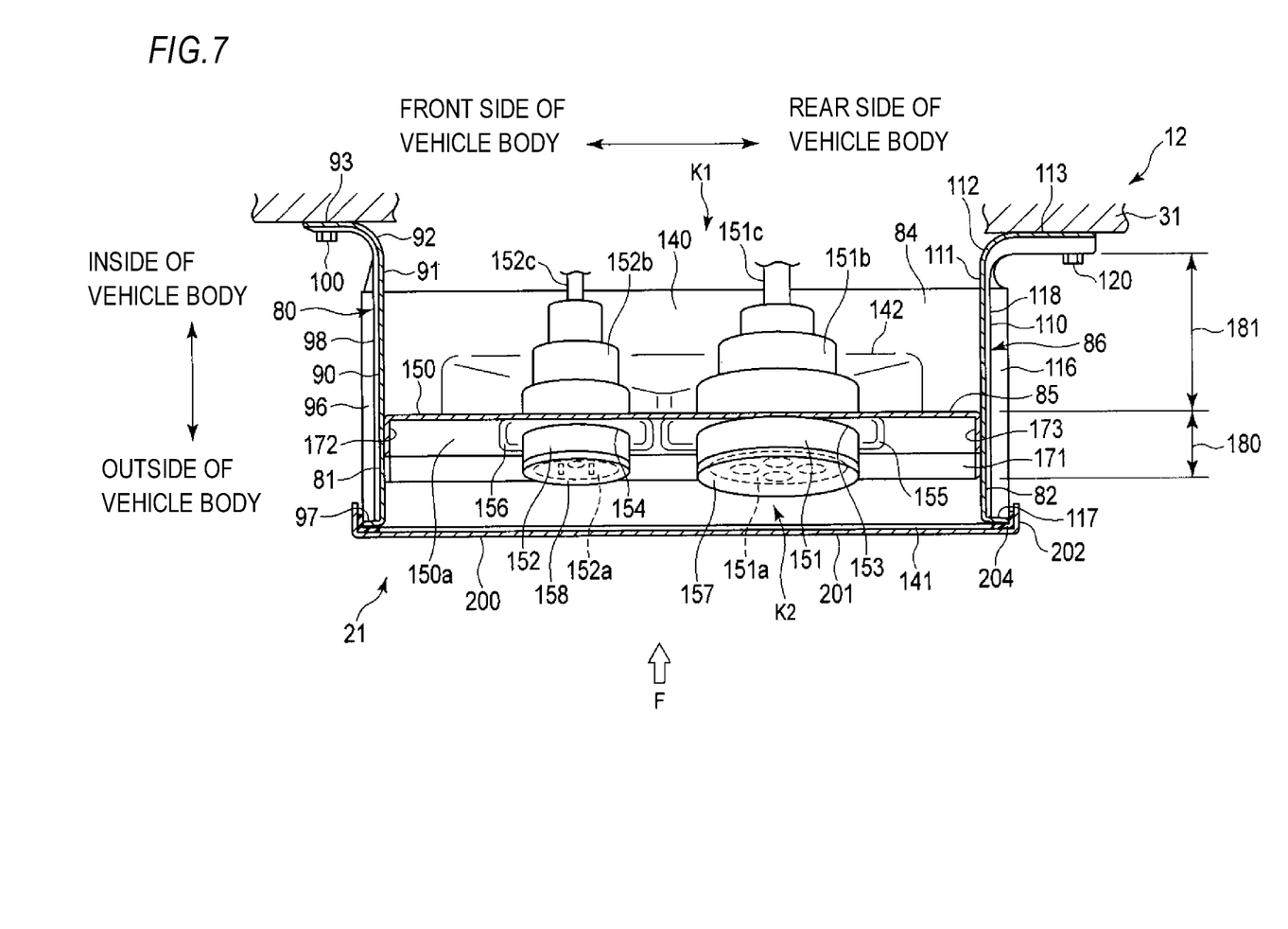
FIG. 7 is a side cross-sectional view showing the charging connector accommodation apparatus.

FIG. 6 is an exploded perspective view showing the charging connector accommodation apparatus 21, and FIG. 7 is a side cross-sectional view thereof. The charging connector accommodation apparatus 21 includes a box body 80 and a lid member 200. The box body 80 has a front panel 81 positioned on the front side of the vehicle body, a rear panel 82 positioned on the rear side of the vehicle body, an upper panel 83 positioned on the upper side, a lower panel 84 positioned on the lower side, and a center panel 85. A frame body 86 is formed by assembling the front panel 81, the rear panel 82, the upper panel 83 and the lower panel 84 into a frame shape and by connecting them by spot welding or the like. The panels 81 to 84 have been respectively formed into the following shapes by pressing steel plates.

The front panel 81 includes a front panel body section 90 extending in the up-down direction, an extension section 91 extending from the front panel body section 90 to the inside of the vehicle body, a curved section 92 bent from the extension section 91 to the front side of the vehicle body, and a mounting section 93 connected to the curved section 92. The curved section 92 has a shape curved into an arc as viewed from above. The height H1 (shown in FIG. 6) of the extension section 91 is lower than the height H2 of the front panel body section 90.

Bent edges 95 and 96 folded respectively to the front side of the vehicle body are formed on the upper end and the lower end of the front panel body section 90. A bent edge 97 folded to the front side of the vehicle body is formed at the vehicle-body outer side end of the front panel body section 90. Bead sections 98 for enhancing face rigidity are formed so as to extend on the front panel body section 90, the curved section 92 and the mounting section 93. In the mounting section 93, holes 101 are formed into which fastening members 100 (shown in FIG. 7), such as bolts, for fastening the front panel 81 to the side member 31 are inserted.

The rear panel 82 includes a rear panel body section 110 extending in the up-down direction, an extension section 111 extending from the rear panel body section 110 to the inside of the vehicle body, a curved section 112 bent from the extension section 111 to the rear side of the vehicle body, and a mounting section 113 connected to the curved section 112. The curved section 112 has a shape curved into an arc as viewed from above. The height H3 (shown in FIG. 6) of the extension section 111 is lower than the height H4 of the rear panel body section 110.

Bent edges 115 and 116 folded respectively to the rear side of the vehicle body are formed on the upper end and the lower end of the rear panel body section 110. A bent edge 117 folded to the rear side of the vehicle body is formed at the vehicle-body outer side end of the rear panel body section 110. Bead sections 118 for enhancing face rigidity are formed so as to extend on the rear panel body section 110, the curved section 112 and the mounting section 113. In order to enhance rigidity in the vicinity of a section on which the charging connectors 151 and 152 are mounted and to which a force is applied when a charging gun 161 is inserted into the charging connectors 151 and 152, the bead sections 118 are located on the same height as the positions of the charging connectors 151 and 152. Namely, the charging connectors 151 and 152 are overlapped with the bead sections 118 in the front-rear direction of the vehicle body 11. In the mounting section 113, holes 121 are formed into which fastening members 120 (shown in FIG. 7), such as bolts, for fastening the rear panel 82 to the side member 31 are inserted.

The upper panel 83 has an upper panel body section 130 being nearly horizontal and a bent edge 131 formed upward at the vehicle-body outer side end of the upper panel body section 130. This bent edge 131 is formed throughout the entire length of the upper panel body section 130 along the longitudinal direction of the upper panel body section 130 (the front-rear direction of the vehicle body). An engagement member 132 is provided on the lower face of the upper panel body section 130. Both ends of the upper panel body section 130 are joined to the bent edge 95 of the front panel 81 and the bent edge 115 of the rear panel 82 by spot welding or the like. Bead sections, for example, may be provided on the upper panel body section 130 to enhance the face rigidity of the upper panel 83.

The lower panel 84 has a lower panel body section 140 being nearly horizontal and an upward bent edge 141 formed at the vehicle-body outer side end of the lower panel body section 140. This bent edge 141 is formed throughout the entire length of the lower panel body section 140 along the longitudinal direction of the lower panel body section 140 (the front-rear direction of the vehicle body). On the lower panel body section 140, a bent section 142 for enhancing the face rigidity of the lower panel 84 is formed. Both ends of the lower panel body section 140 are joined to the bent edge 96 of the front panel 81 and the bent edge 116 of the rear panel 82 by spot welding or the like. On the lower face of the lower panel body section 140, a pair of hinge members 145 is mounted near the bent edge 141.

Figure 8:
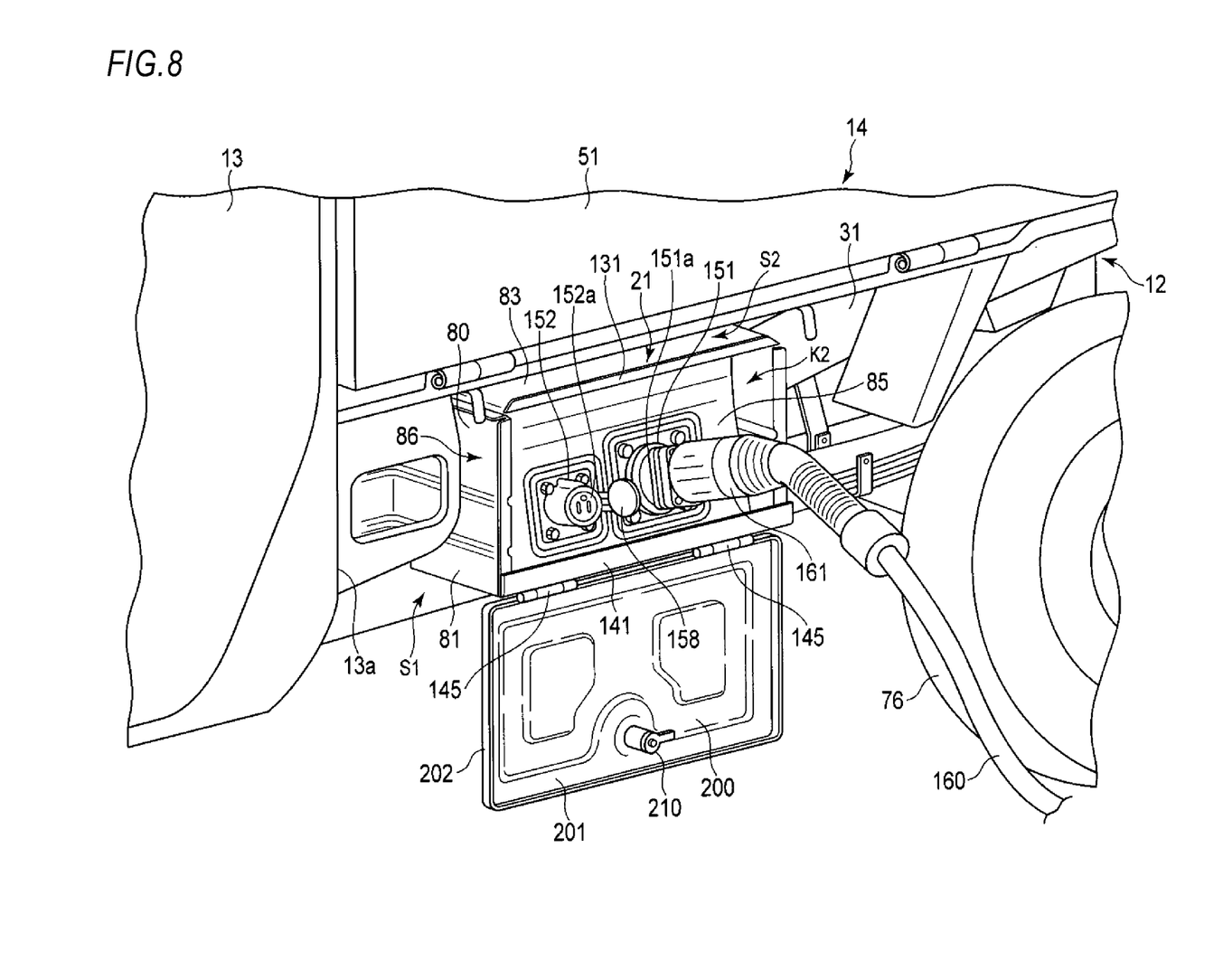
FIG. 8 is a perspective view showing a state in which a charging cable is connected to a charge connector.

The center panel 85 has a center panel body section 150 extending in the up-down direction. The center panel body section 150 has a lower portion 150a and an upper portion 150b. A first charge connector 151 and a second charge connector 152 shown in FIGS. 7 and 8 are disposed on the lower portion 150a. A first mounting hole 153 into which the first charge connector 151 is inserted and a second mounting hole 154 into which the second charge connector 152 is inserted are formed in the lower portion 150a of the center panel body section 150. Around these mounting holes 153 and 154, stepped sections 155 and 156 for enhancing the face rigidity of the center panel body section 150 are formed. Caps 157 and 158 capable of being opened and closed are provided at the connection port portions 151a and 152a of the charging connectors 151 and 152, respectively. The caps 157 and 158 are opened during charging operation.

For the purpose of enhancing operability at the time when the charging gun 161 (shown in FIG. 8) of a power cable 160 is attached to and detached from the charging connector 151, an inclination angle θ (shown in FIG. 4) is given to the lower portion 150a of the center panel 85 so that the upper side thereof is slightly tilted to the inside of the vehicle body. Hence, each of the connection port portions 151a and 152a of the charging connectors 151 and 152 mounted on the center panel 85 has an attitude directed slightly upward.

The first charge connector 151 has a shape capable of being mechanically and electrically connected to the charging gun 161 of the power cable 160 for quick charging, for example. FIG. 8 shows a state in which the charging gun 161 for quick charging is connected to the first charge connector 151. The second charge connector 152 is used for a 200 V commercial power source for general household, for example. The charging connectors 151 and 152 are covered with the caps 157 and 158, respectively, except during charging.

Bent edges 170 and 171 are formed at the upper and lower ends of the center panel body section 150, respectively. Furthermore, bent edges 172 and 173 are formed at both ends of the center panel body section 150, respectively, in the front-rear direction of the vehicle body. These bent edges 170, 171, 172 and 173 are all folded toward the outside of the vehicle body. The upper bent edge 170 and the lower bent edge 171 are respectively joined to the inner peripheral faces of the frame body 86 (the inner faces of the upper panel 83 and the lower panel 84) by spot welding or the like. The bent edge 172 on the front side of the vehicle body and the bent edge 173 on the rear side of the vehicle body are respectively joined to the inner peripheral faces of the frame body 86 (the inner faces of the front panel 81 and the rear panel 82) by spot welding or the like. Moreover, the center panel 85 is disposed so as to block the frame body 86 inside the frame body 86.

Since the bent edges 170, 171, 172 and 173 formed at the peripheral ends of the center panel 85 are all bent so as to be directed to the outside of the vehicle body and joined to the inner peripheral faces of the frame body 86 as described above, a highly rigid frame section 180 (shown in FIG. 7), the strength of which is enhanced by the bent edges 170, 171, 172 and 173, is formed more outward to the outside of the vehicle body than the center panel 85 of the box body 80. Inside this highly rigid frame section 180, the connection port portions 151a and 152a of the charging connectors 151 and 152 are disposed.

Since an inner wall formed of a panel or the like is not provided more inward to the inside of the vehicle body than the center panel 85 of the box body 80, a hollow frame section 181 having an opening K1 (shown in FIG. 7) being open so as to face the inside of the vehicle body is formed. When a collision load F (shown in FIG. 7) is input from a side of the vehicle body, the strength of the hollow frame section 181 of the box body 80 is lower than the strength of the highly rigid frame section 180.

The cable side portions 151*b* and 152*b* of the charging connectors 151 and 152 are disposed in the hollow frame section 181 of the box body 80. The electric cables 151*c* and 152*c* thereof pass below the side member 31 and are connected to the charger 20 (shown in FIG. 1) as partly shown in FIG. 4.

The vehicle-body outer side opening K2 (shown in FIG. 7) of the box body 80 can be blocked with the lid member 200 capable of being opened and closed. The lid member 200 has a lid body section 201 having a size sufficient to cover the opening K2 of the box body 80 and a flange section 202 formed throughout all the peripheral ends of the lid body section 201. On the lid body section 201, stepped sections 203 are formed to enhance the face rigidity thereof.

A packing 204 (partly shown in FIG. 7) for waterproofing and dust proofing is provided between the flange section 202 of the lid member 200 and the box body 80. The flange section 202 has a shape capable of covering the bent edges 97, 117, 131 and 141 from the outside of the vehicle body. The lower section of the lid member 200 is attached to the lower panel 84 of the box body 80 via hinge members 145 so as to be turnable in the up-down direction.

The lid member 200 can be turned in the up-down direction between the closed position shown in FIG. 5 and the open position shown in FIG. 8. A lock member 210 is provided, for example, in the upper portion of the lid member 200. When the lock member 210 is operated to the closed position thereof using a key 211 (shown in FIG. 6), the lid member 200 is engaged with the engagement member 132 of the box body 80, whereby the lid member 200 can be locked to the closed position (shown in FIG. 5). When the lock member 210 is operated to the open position thereof using the key 211, the lid member 200 can be opened.

With the charging connector accommodation apparatus 21 according to this embodiment, the first charge connector 151 and the second charge connector 152 are accommodated in the box body 80 and covered with the lid member 200. Hence, the charging connectors 151 and 152 can be avoided from being adversely affected by rainfall and by water, mud, and the like spattering during vehicle running. Furthermore, since the charging connector accommodation apparatus 21 is accommodated in the space S1 below the loading platform 14, the loading platform 14 plays the role of an "eave" for water pouring from above during rainfall and during vehicle washing.

Moreover, a space S2 is provided between the loading platform 14 and the charging connector accommodation apparatus 21, and the upward bent edge 131 is formed at the upper end of the upper panel 83. Hence, the bent edge 131 of the upper panel 83 can prevent water falling along the loading platform 14 from flowing around and entering the inside of the opening K2. For this reason, even if the lid member 200 is in a state of being open, it is possible to suppress water, mud, and the like falling onto the upper panel 83 from entering the inside of the box body 80. In a state in which the lid member 200 is closed, the lid member 200 can prevent water, mud, and the like from entering the inside of the box body 80.

Still further, since the strength of the highly rigid frame section 180 (shown in FIG. 7) of the box body 80 is higher than that of the hollow frame section 181, in the case that a collision from a side of the vehicle body is assumed to occur, before the highly rigid frame section 180 is deformed significantly due to a collision load input to the lid member 200, the deformation of the hollow frame section 181, such as the extension sections 91 and 111, proceeds starting from the curved sections 92 and 112, and the panels 81, 82, 83 and 84 are deformed plastically, whereby a part of the energy is absorbed. In addition, since the charging connector accommodation apparatus 21 is disposed in the space S1 enclosed with the portion 13*a* of the cabin 13 and the rear tire 76 under the loading platform 14, it is possible, to some extent, to prevent obstacles from getting into the center panel 85.

Even if the highly rigid frame section 180 is moved to the inside of the vehicle body due to the collision load and the hollow frame section 181 is deformed, for example, buckled, the hollow frame section 181 does not have such an inner wall into which the cable side portions 151*b* and 152*b* of the charging connectors 151 and 152 are bumped. In other words, a stroke through which the charging connectors 151 and 152 can move, to some extent, toward the inside of the vehicle body is obtained securely.

As a result, even if such a load as to cause the box body 80 and the lid member 200 to be deformed is exerted thereto, it is possible to avoid an excessive reaction force from acting on the charging connectors 151 and 152. In particular, it is possible to suppress the connection port portions 151*a* and 152*a* of the charging connectors 151 and 152 from being damaged and the electric cables 151*c* and 152*c* from being damaged, whereby it is possible to avoid one of causes of electrical short circuit. Furthermore, since the electric cables 151*c* and 152*c* of the charging connectors 151 and 152 are covered with the charging connector accommodation apparatus 21, the electric cables 151*c* and 152*c* can be prevented from being exposed to the outside of the vehicle body. Moreover, even if the power cable 160 is pulled hard during charging operation, since the center panel 85 on which the charging connectors 151 and 152 are mounted has high rigidity thanks to the panels 81, 82, 83 and 84 and the bent edges 170 to 173 provided so as to enclose the four peripheral sides thereof, the center panel 85 can securely hold the charging gun 161 inserted into the charging connector 151, for example.

When the present invention is put into practice, the shapes, structures, dispositions, or the like of the box body and the lid member of the charging connector accommodation apparatus can be modified and implemented appropriately as a matter of course. For example, at least some of the front panel, rear panel, upper panel and lower panel may be integrally formed using common steel plates. Furthermore, the modes of the vehicle body, the drive battery, or the like are not limited to those according to the above-mentioned embodiment, but can be implemented in various modes. Moreover, the charging connector accommodation apparatus according to the present invention can be applied to not only electric automobiles running on only an electric motor but also hybrid vehicles having a drive electric motor and an engine. Namely, in the above description, the electric vehicle includes the electric automobile and the hybrid vehicle.

According to an aspect of the invention, since the charging connectors are accommodated in the box body covered with the lid member, it is possible to protect the charging connectors against rainfall, against water splashing during vehicle running, and against water, mud, and the like spattering during vehicle washing. In addition, since the connection port portions of the charging connectors are disposed on the highly rigid frame section of the box body, the connection port portions are hard to be deformed during charging operation, thereby ensuring excellent operability. Furthermore, when a collision load is input from a side of the vehicle body, the deformation of the hollow frame section proceeds before the highly rigid frame section is deformed significantly, and moreover, the hollow frame section does not have such an inner wall into which the charging connectors are bumped, whereby a stroke through which the charging connectors can move to the inside of the vehicle body can be obtained securely. As a result, it is possible to avoid an excessive reaction force from acting on the charging connectors, and it is also possible to suppress the charging connectors and the electric cables from being damaged. Still further, since the electric cables of the charging connectors are covered with the charging connector accommodation apparatus, the electric cables can be prevented from being exposed to the outside of the vehicle body.

What is claimed is:

1. A charging connector accommodation apparatus for use in a truck-type or pickup-type electric vehicle having a drive motor and a drive battery configured to supply electric power to the drive motor, the charging connector accommodation apparatus comprising:
   a box body having a first opening opened to an outside of a vehicle body and a second opening opened to an inside of the vehicle body; and
   a lid member, capable of being opened and closed, configured to cover the first opening, wherein
   the box body includes:
   a frame body made of a plurality of panels and formed into a frame shape, one end of the frame body defining the first opening and another end of the frame body defining the second opening; and
   a center panel disposed inside the frame body at a position between the first opening and the second opening, the center panel has
   a bent edge, at a peripheral end thereof, folded toward the first opening and joined to an inner peripheral face of the frame body,
   the frame body and the center panel form,
      a highly rigid frame section which is enhanced in rigidity by virtue of the bent edge and in which a connection port portion of a charging connector is disposed is provided more outward to the outside of the vehicle body than the center panel of the box body, and
      a hollow frame section which has rigidity lower than that of the highly rigid frame section against a load input from the outside of the vehicle body and in which a cable side portion of the charging connector is disposed is provided more inward to the inside of the vehicle body than the center panel of the box body.

2. The charging connector accommodation apparatus according to claim 1, wherein
   the plurality of panels of the frame body are a front panel positioned on a front side of the vehicle body, a rear panel positioned on a rear side of the vehicle body, an upper panel positioned on an upper side, and a lower panel positioned on a lower side,
   the front panel includes: a front panel body section; an extension section which extends from the front panel body section to the inside of the vehicle body and a height of which is lower than that of the front panel body section; and a mounting section which extends from the extension section to the front side of the vehicle body and which is secured to a vehicle-body outer side face of a side member, and
   the rear panel includes: a rear panel body section; an extension section which extends from the rear panel body section to the inside of the vehicle body and a height of which is lower than that of the rear panel body section; and a mounting section which extends from the extension section to the rear side of the vehicle body and which is secured to the vehicle-body outer side face of the side member.

3. The charging connector accommodation apparatus according to claim 2, wherein
   an upward bent edge is formed at a vehicle-body outer side end of the upper panel, and
   a flange section configured to cover the upward bent edge from the outside of the vehicle body is provided on the lid member.

4. The charging connector accommodation apparatus according to claim 1, wherein
   the center panel includes a lower portion and an upper portion,
   an upper side of the lower portion has a shape tilted to the inside of the vehicle body, and
   the charging connector is mounted on the lower portion.

5. The charging connector accommodation apparatus according to claim 1, wherein
   the box body is mounted on a vehicle-body outer side face of a side member in a space formed between a rear face of a cabin of the vehicle below a loading platform and a rear tire.

6. The charging connector accommodation apparatus according to claim 2, wherein
   the rear panel is formed with a bead section, and
   a height of the bead section is the same as a height of the charging connector.

* * * * *